United States Patent
Mejean

(10) Patent No.: US 11,902,687 B1
(45) Date of Patent: Feb. 13, 2024

(54) PROGRAMMABLE PHASE GENERATOR FOR A RADIATION DETECTOR

(71) Applicant: LYNRED, Palaiseau (FR)

(72) Inventor: Philippe Mejean, Montaud (FR)

(73) Assignee: LYNRED, Palaiseau (FR)

( * ) Notice: Subject to any disclaimer, the term of this patent is extended or adjusted under 35 U.S.C. 154(b) by 0 days.

(21) Appl. No.: 18/025,264

(22) PCT Filed: Oct. 19, 2021

(86) PCT No.: PCT/FR2021/051816
§ 371 (c)(1),
(2) Date: Mar. 8, 2023

(87) PCT Pub. No.: WO2022/106766
PCT Pub. Date: May 27, 2022

(30) Foreign Application Priority Data

Nov. 19, 2020 (FR) ...................................... 2011862

(51) Int. Cl.
| | |
|---|---|
| *H04N 25/76* | (2023.01) |
| *H04N 23/667* | (2023.01) |
| *H04N 25/709* | (2023.01) |
| *H04N 25/20* | (2023.01) |

(52) U.S. Cl.
CPC ....... *H04N 25/7795* (2023.01); *H04N 23/667* (2023.01); *H04N 25/709* (2023.01); *H04N 25/20* (2023.01)

(58) Field of Classification Search
CPC ............. H04N 25/7795; H04N 23/667; H04N 25/709; H04N 25/20
See application file for complete search history.

(56) References Cited

U.S. PATENT DOCUMENTS

2006/0197849 A1\* 9/2006 Wernersson ......... H04N 1/2141
348/E5.042
2014/0247382 A1 9/2014 Moldovan et al.

FOREIGN PATENT DOCUMENTS

| EP | 1596286 A2 | 11/2005 |
|---|---|---|
| WO | WO-2019166465 A1 | 9/2019 |

OTHER PUBLICATIONS

International Search Report and Written Opinion issued in International Patent Application No. PCT/FR2021/051816, dated Mar. 3, 2022.

\* cited by examiner

*Primary Examiner* — Georgia Y Epps
*Assistant Examiner* — Don J Williams
(74) *Attorney, Agent, or Firm* — MARSHALL, GERSTEIN & BORUN LLP

(57) ABSTRACT

A generator of phases of a detector integrates at least one elementary machine for interpreting a microcode stored in a register. Each elementary machine includes at least one control input having a logic level change detector. Each elementary machine also includes at least one phase output having a controlled switch, enabling to define the logic level of the phase output, and a controlled inverter enabling to toggle the logic level of the phase output. Further, each elementary machine includes at least one clock signal associated with a counter, and a unit for loading the instructions and the arguments stored in the register, the instructions being coded over 3 bits.

9 Claims, 5 Drawing Sheets

PROGRAMMABLE PHASE GENERATOR FOR A RADIATION DETECTOR

DOMAIN OF THE INVENTION

The present disclosure relates to the field of the detection of electromagnetic radiations and, particularly, to the detection of infrared radiations.

The invention more particularly concerns a programmable generator of phases for such a detector, that is, an electronic circuit enabling to control the operation of the detector.

The invention finds a particularly advantageous application to control a detector comprising a plurality of distinct operating modes.

BACKGROUND

Detectors intended for thermal or infrared imaging are conventionally manufactured in the form of an array of elementary detectors, forming image points or pixels, in one or two dimensions. To guarantee the thermal insulation of the detectors, the latter are suspended above a substrate via support arms.

The substrate usually comprises means of sequential addressing of the elementary detectors and means of electric excitation and of pre-processing of the electric signals generated from these elementary detectors. The substrate and the integrated means are commonly designated with the term "readout circuit".

To control such a readout circuit, it is known to use a generator enabling to deliver the signals necessary for the circuit operation. These signals are called "phases". Conventionally, the phases enable to drive switches present at the level of the readout circuit and of each elementary detector. For example, these switches may control the information exchange between a photodiode and a readout circuit, the data exchange between different capacitive elements and amplifiers, as well as electric transmissions between the elementary detectors.

With these phases, an infrared detector may be controlled to integrate different gains or to implement complex functions, such as the obtaining of a bispectral image.

In the sense of the invention, the "gain" corresponds to a conversion factor between a photon and a voltage. This conversion factor depending on the integration performed, for example, on the used integration capacity, and on the dynamic range of the phases.

To implement logic functions, document WO2019/166465 illustrates, for example, the shape of the expected phases to obtain an operating mode of an infrared detector where the detector has a high readout dynamic range.

The phases generated by a phase generator thus enable to place an infrared detector in a specific operating mode by controlling the duration of integration, the activation and/or the inhibition of certain components of the readout circuit or of the elementary detectors.

A phase generator is conventionally formed, according to phase shapes defined before the forming of the infrared detector, by implementing logic functions enabling to create the predefined phase shapes. This type of phase generator is thus hardcoded. Of course, these phases may vary according to a control signal to activate one or the other of the operating modes of the infrared detector.

To satisfy as much as possible the users' needs, constructors integrate more and more functions in the readout circuits and the elementary detectors, whereby it becomes possible to obtain a same gain by generating distinct phases, that is, by modifying the sequencing and/or the binary value of the phases. Thus, after the implementation of the infrared detector, it is often observed that the shape of the phases enabling to obtain a specific gain is not optimal due to the parasitic elements and to the limitations of the infrared detector, observable after the forming thereof only.

Typically, parasitic elements may appear due to the manufacturing tolerances of the capacitive elements formed at the level of the elementary detectors. Further, if a plurality of capacitive elements is formed at the level of each elementary detector to obtain distinct gains, it may be searched what capacitive elements must be activated to optimally obtain each gain after the measurement of the real values of the formed capacitive elements.

In the most recent infrared detectors, it is not unusual to integrate more than 15 operating modes, for example, 18 operating modes. With such a number of operating modes, the implementation of a hardcoded phase generator becomes particularly complex, since the latter must integrate all the electronic components enabling to generate the shape of each phase of each operating mode. Further, with the multiplicity of electronic components, the phase generator generates a power consumption much greater than the power consumption of a hardcoded generator of phases of an infrared detector only having a small number of operating modes.

To partly overcome these problems and allow the generation of optimal phases, it is possible to use a programmable phase generator. Such a generator is similar to a microprocessor; it integrates a program memory having the instructions to be implemented to generate the phases coded therein. From this program memory, a processor interprets the instructions coded in the program memory. Conventionally, a microcontroller also integrates a data memory, a working or state register, analog-to-digital and digital-to-analog converters, and wired operators enabling to perform arithmetical operations, conditional operations, and speculative executions of the code.

The major disadvantage of these programmable phase generators lies in their power consumption, typically at least ten times greater than that of a hardcoded phase generator.

The technical problem that the invention provides solving thus is to obtain a programmable phase generator, that is, a generator enabling to control the obtaining of a plurality of distinct phases according to a program code, with a power consumption comparable with that of a hardcoded phase generator.

BRIEF DESCRIPTION OF THE INVENTION

To address this technical problem, the invention provides a programmable phase generator comprising no data memory, no working or state register, no analog-to-digital and digital-to-analog converter, and no wired operator enabling to perform arithmetic operations, conditional operations, and speculative executions of the code.

Indeed, the invention results from a search for the simplest instructions enabling to generate the specific phases of an infrared detector. It has been observed that with at most seven instructions, it is possible to generate all the phase shapes conventionally used in this specific domain.

Thus, it is possible to form a programmable phase generator which is very simple, that is, capable of only interpreting instructions coded over 3 bits.

For this purpose, the invention concerns a generator of phases of a detector, the generator integrating at least one elementary machine for interpreting a microcode stored in a register, each elementary machine comprising:
- at least one control input comprising a logic level change detector;
- at least one phase output comprising a controlled switch, enabling to define the logic level of the phase output, and a controlled inverter enabling to toggle the logic level of the phase output;
- at least one clock signal associated with a counter;
- a unit for loading the instructions and the arguments stored in the register, the instructions being coded over 3 bits and enabling to implement at least:
- an application of a logic level onto at least one phase output;
- a toggling of the logic level of at least one phase output;
- a synchronization with a logic change of a control input;
- a wait for a predetermined duration; and
- a restarting of a predetermined sequence;
- means for inhibiting the loading unit; and
- a unit for executing the instructions loaded by the loading unit, the execution unit being configured to:
- control the position of at least one controlled switch after an instruction of application;
- control the activation of at least one controlled inverter after an instruction to toggle;
- detect a logic change after an instruction of synchronization;
- control the inhibition of the inhibition means for a duration measured by the counter after a wait instruction; and
- control the position of a pointer of the loading unit after a restart instruction.

The invention enables, with a few simple and easy-to-implement instructions, to program the phases of a detector, for example, an infrared detector. In other words, the search for the simplest instructions enabling to generate the specific phases of a detector has enabled to drastically decrease the possibilities of a conventional programmable phase generator to limit its complexity.

The invention thus enables to obtain a programmable phase generator with a power consumption comparable to that of a hardcoded phase generator. The larger the number of operating modes of the detector, the more the use of the programmable phase generator of the invention becomes advantageous over a hardcoded phase generator.

Typically, for a detector having more than 15 operating modes, for example, 18 operating modes, the programmable phase generator of the invention is more advantageous than a hardcoded phase generator since they both have an equivalent power consumption. However, the programmable phase generator enables to obtain optimal phases by taking into account the parasitic elements and the limitations of the infrared detector, observable after its forming.

The minimal instructions identified to form the different conventional phases of a detector are:
- the application of a logic level onto at least one phase output;
- the toggling of the logic level of at least one phase output;
- the synchronization with at least one control input;
- the waiting for a predetermined duration; and
- the restarting of a predetermined sequence.

The application of a logic level is implemented by a simple controlled switch associated with each output.

For this purpose, each controlled switch is wired between an output and logic level "1" or logic level "0" according to the control signal applied to the controlled switch.

Similarly, a simple controlled inverter is placed at the level of each output to allow the toggling of the logic level of an output.

To synchronize the execution of the microcode on the receiving of an external signal, a detector enables to detect a logic change of a control input.

While waiting for this synchronization signal, the operation of the loading unit has to be inhibited by the inhibition means. For this purpose, it is possible to use an inhibition signal generated by the execution unit.

Preferably, said means for inhibiting the loading unit are interposed between a clock signal of the elementary machine and a clock signal transmitted to the loading unit. Thus, it is possible to easily inhibit the operation of the loading unit by blocking its clock signal used to rate its operations.

The wait instruction also requires inhibiting the operation of the loading unit while the execution unit uses the counter to reach the predetermined wait duration. Preferably, the instructions enable to implement:
- a short wait; and
- a long wait;
- the length of the argument of the long wait being greater than the length of the argument of the short wait.

Preferably, the argument of the short wait is coded over 4 bits. This short wait thus enables to represent the operation of all the phases having a strong variation with the optimum number of bits to limit the resources of the elementary machine.

Preferably, the argument of the long wait is coded over 14 bits. This long wait enables to represent the operation of all the phases having a low variation with the optimum number of bits to take into account the maximum variation duration observed on the phases of a detector.

In addition to these instructions, another instruction preferably enables to place the elementary machine in a low power consumption mode, where the execution unit inhibits the operation of a plurality of components of the elementary machine.

Further, it is possible to generate a plurality of phases with a single elementary machine or a plurality of juxtaposed elementary machines. For example, the phase generator may comprise at least two elementary machines. This embodiment enables to increase the number of phases capable of being simultaneously generated.

Preferably, the phase generator comprises a programmable multiplexer arranged at the output of the elementary machine. This embodiment also enables to ease the coding of an operating mode of the detector by modifying the routing of the outputs of said elementary machine.

BRIEF DESCRIPTION OF THE DRAWINGS

The invention will be well understood on reading of the following description, the details of which are given as an example only, and developed in relation with the appended drawings, where identical references relate to identical elements.

DETAILED DESCRIPTION

The programmable phase generator 10 according to the invention is capable of generating a plurality of phase shapes according to a microcode.

This microcode is formed by a set of bits stored in a register 12 of an elementary machine 14 of programmable phase generator 10. In the following description, a "computer function" corresponds to a control of a computer programming language enabling to formulate an algorithm. Further, an "instruction" corresponds to a physical implementation of a computer function in the register 12 of an elementary machine 14. These instructions stored in register 12 altogether form the "microcode".

Figure 1:
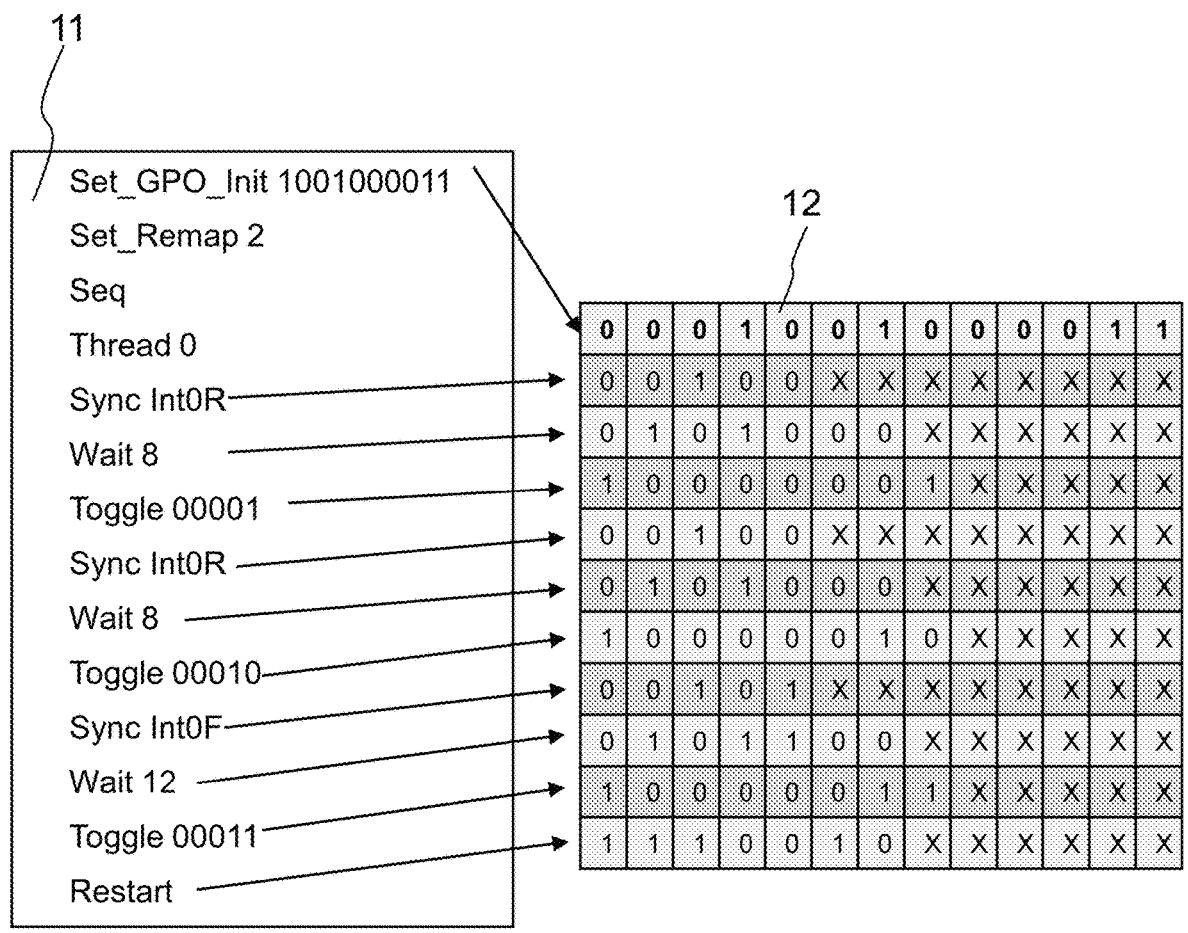
FIG. 1 illustrates a programming file and the associated binary code of a register of an elementary machine of a programmable phase generator according to an embodiment of the invention.

To obtain this microcode, a programming machine 28 transforms a programming file 11 into a microcode, such as illustrated in FIG. 1. Programming file 11 may be coded with a programming language specifically adapted to programmable phase generator 10 or by using a generic programming language, such as the assembly language or the C language. Of course, the functions conventionally used by these languages cannot all be implemented in register 12, since at most seven instructions Inst can be recognized by programming machine 28 to be integrated in register 12. Indeed, to limit the complexity and the power consumption of elementary machine 14, instructions Inst are coded over 3 bits, so that only 7 computer functions may be recognized by programming machine 28.

In the example of FIG. 1, a programming file 11 typical of the phase generation is described. In this programming file 11, a first computer function Set_GPO_Init enables to apply a logic level on the different phase outputs INT, XRINT1, XRINT2 of programmable phase generator 10. It is an instruction of initialization of programmable phase generator 10. During the transformation of programming file 11 in register 12, this first computer function Set_GPO_Init is coded with 000 and the argument of this computer function Set_GPO_Init is placed after code 000 in register 12.

In the sense of the invention, "argument" designates the variable of a computer function.

The second computer function Set_Remap of programming file 11 specifies a position of a programmable multiplexer 26 of programmable phase generator 10.

The third computer function Seq of programming file 11 indicates a beacon from which the program will be executed in a loop. This beacon thus enables to program an infinite loop between computer function Restart and computer function Seq.

The fourth computer function Thread of programming file 11 enables to specify the elementary machine 14 on which the microcode is to be executed.

By using argument 0 after computer function Thread, first elementary machine 14 is targeted for the loop followed between computer function Seq and computer function Restart. In the example of FIG. 1, a single elementary machine 14 is programmed. As a variant, a plurality of elementary machines 14 may be implemented in programmable phase generator 10 and programming file 11 may integrate computer functions for a plurality of distinct elementary machines 14 by using a plurality of computer functions Thread with distinct arguments.

The first line of the infinite loop comprises synchronization computer function Sync allowing the synchronization with at least one control input GPI_0, GPI_1 of elementary machine 14. More specifically, this instruction is coded with 001 and targets the detection of a rising edge on internal signal Int0R of elementary machine 14. The argument of this function is 00 and it enables to define the internal signal with which this function is to be synchronized. Thus, to implement this computer function Sync Int0R, register 12 integrates a second line with instruction 001, corresponding to a synchronization computer function Sync, and with the argument 00 corresponding to a detection of a rising edge on internal signal Int0R. The next bits are represented by an X since they are random and they do not influence the operation of elementary machine 14.

The third instruction coded in register 12 concerns wait computer function Wait of a predetermined duration having argument 8. In the example of FIG. 1, this wait instruction is coded with 010 in register 12 and argument 8 is coded over four bits with 1000 as a binary value. In the example of FIG. 1, a single type of wait instruction is described and is coded over four bits. As a variant, two wait instructions may be implemented: a short wait instruction and a long wait instruction.

The short wait instruction then has an argument coded over 4 bits, such as illustrated in FIG. 1 while the long wait instruction may comprise an argument coded over a larger number of bits, for example, 14 bits, to describe the variation of very seldom used phases.

After this wait instruction, the infinite loop comprises a computer function Toggle for toggling the logic level of at least one phase output GPO_0-GPO_9.

This toggle computer function Toggle is used with a 5 bit-argument enabling to specify one or a plurality of phase outputs GPO_0-GPO_9 to be toggled. This toggle computer function Toggle is coded in the form of instruction 100 in register 12 and, after this code of instruction Inst, register 12 has the value of argument 00001.

A new synchronization computer function Sync is then coded in register 12. This synchronization computer function Sync is similar to that integrated in the second line of register 12 and it is also followed by a wait computer function Wait also similar to that previously used.

After this second wait computer function Wait, a new toggle computer function Toggle is used. This second toggle computer function Toggle has an argument different from the first toggle computer function Toggle, since the argument of the second toggle computer function Toggle is 00010.

A new synchronization function Sync is then programmed with an argument aiming at detecting a rising edge on internal signal Int0F. This detection of a rising edge on internal signal Int0F is coded with 01. Thus, the line of register 12 associated with this synchronization computer function Sync exhibits bits 00101, with code 001 to describe the synchronization instruction and argument 01 to describe the argument of this instruction.

After this synchronization computer function Sync, a new wait computer function Wait is coded with a wait duration of 12. Thus, the argument of this synchronization computer function Sync is coded with 1100. The last instruction of the infinite loop corresponds to a new toggle computer function Toggle with binary code 0001 as an argument.

Eventually, restart computer function Restart is coded in register 12 with code 111. This instruction 111 has argument 0010 which sends back to the second line of register 12, since restart computer function Restart echoes the beacon Seq placed after computer function Set_GPO_Init.

Figure 2:
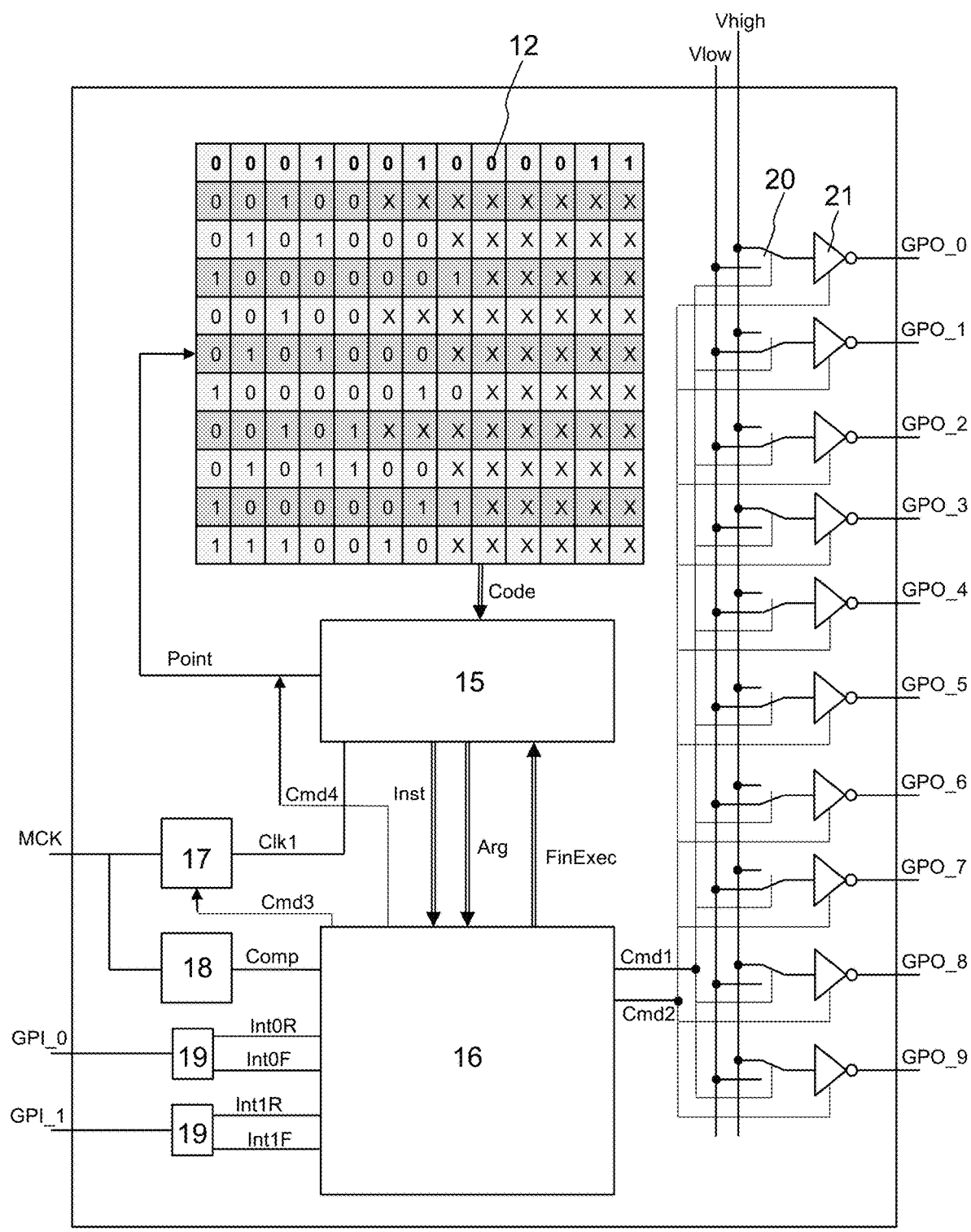
FIG. 2 illustrates an elementary machine of a programmable phase generator according to an embodiment of the invention.

To interpret these different instructions with their respective arguments, an elementary machine 14 may be developed based on the model of FIG. 2. Elementary machine 14 comprises two control inputs GPI_0, GPI_1 enabling to control the operation of elementary machine 12 during a synchronization instruction. For this purpose, each control input comprises a detector 19 enabling to detect a logic change, that is, a rising edge or a falling edge on each control input GPI_0, GPI_1. At the output of the detectors 19 associated with each control input GPI_0, GPI_1, elementary machine 14 comprises internal signals indicating the detections of rising edges Int0F and Int1F or of falling edges Int0R and Int0R of the two control inputs GPI_0, GPI_1.

Elementary machine 14 also has ten phase outputs GPO_0-GPO_9 intended to control a detector. To implement the application instructions, each phase output GPO_0-GPO_9 comprises a controlled switch 20. Each controlled switch 20 is wired between an output GPO_0-GPO_9 and the high logic level, called Vhigh, or the low logic level, called Vlow, according to the control signal Cmd1 applied to controlled switch 20. In addition to this controlled switch 20, each output GPO_0-GPO_9 also comprises a logic inverter 21, enabling to apply the instruction for toggling the logic level of output GPO_0-GPO_9 during the application of a control signal Cmd2.

Further, elementary machine 14 also comprises an input MCK for a clock signal enabling to rate the execution of the instructions. This clock signal MCK is connected to inhibition means 17 and a counter 18.

Elementary machine 14 has the function of decoding the microcode loaded into register 12. For this purpose, elementary machine 14 comprises a loading unit 15 configured to detect the instruction Inst to be performed as well as its argument Arg. Loading unit 15 is coupled to an execution unit 16 configured to execute the instructions Inst transmitted by loading unit 15.

Figure 3:
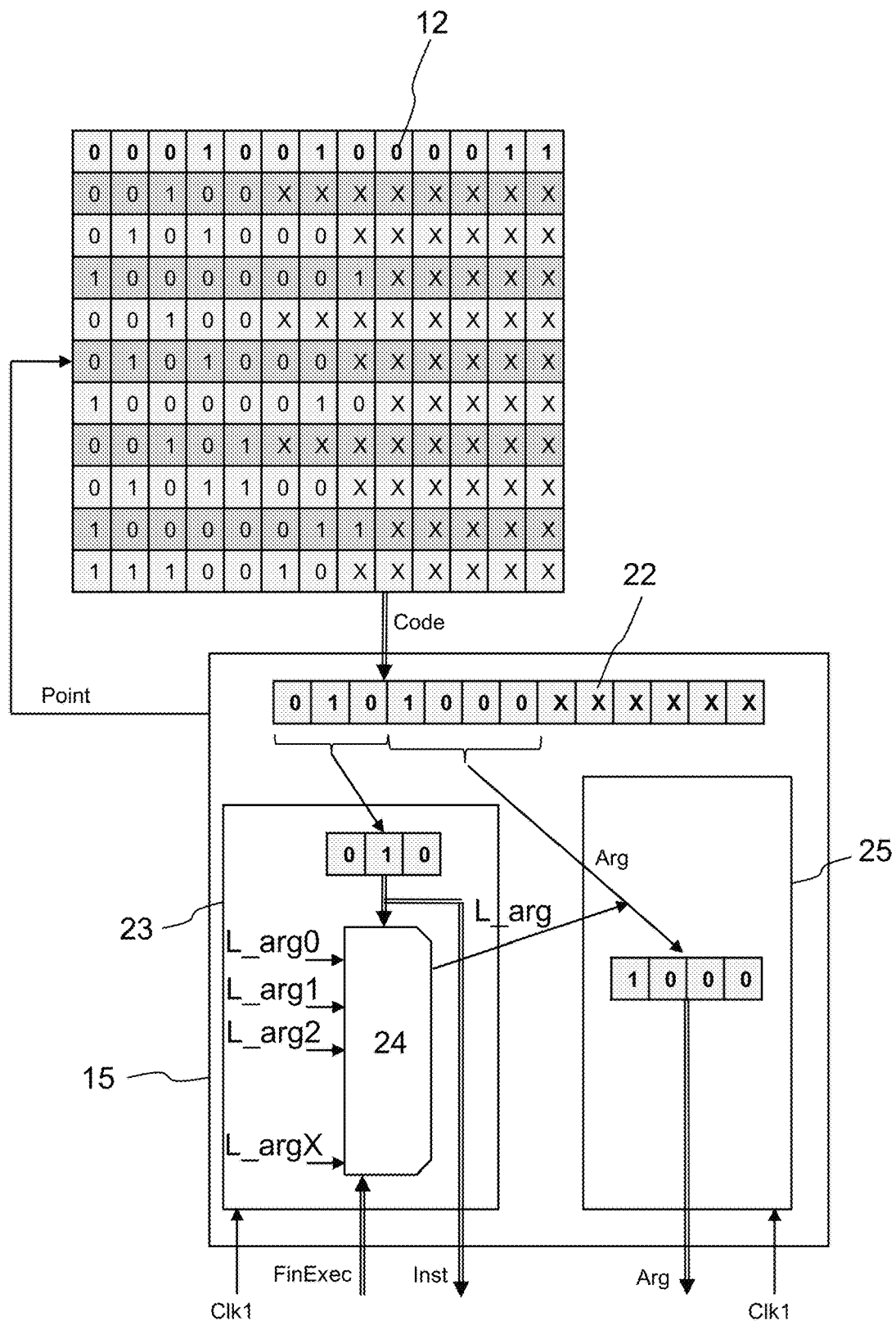
FIG. 3 illustrates a unit for loading the elementary machine of FIG. 2.

Loading unit 15 is more particularly detailed in FIG. 3. This loading unit 15 comprises an instruction decoder 23 coupled to a decoder of arguments 25. For each line of register 12, loading unit 15 uses a pointer Point to extract a specific line.

In the example of FIG. 3, a line is copied into an inner register 22 to ease the understanding of the extraction of the useful bits. Preferably, the extraction of the data of register 12 may be directly carried out on register 12 without requiring a copying into an inner register 22.

From this extracted line, the first three bits are transmitted to an instruction register in instruction decoder 23. Again, the instruction register, like inner register 22, aims at illustrating the useful bit extraction method and it is not necessary in practice.

When the bits corresponding to the instruction are extracted from register 12, they may directly be transmitted to execution unit 16 by signal Inst. Further, these bits are also directed towards a selector 24 having its inputs corresponding to the different possible argument sizes of the different instructions L_arg0, L_arg1, L_arg2 . . . L_argX. Thus, according to the detected instruction, the size of its argument L_arg is delivered at the output of selector 24. This argument size L_arg is transmitted to the decoder of arguments 25 which copies the number of bits corresponding to the size of the argument into an argument register. Again, the argument register, like inner register 22, aims at illustrating the useful bit extraction method and it is not necessary in practice. The bits corresponding to the argument may then be transmitted to execution unit 16 by signal Arg.

As illustrated in FIG. 3, loading unit 15 is preferably rated by a clock signal Clk1. For this purpose, instruction decoder 23 may be configured to perform a decoding at each rising edge of clock signal Clk1. Inside of instruction decoder 23, selector 24 may also be inhibited until a signal FinExec of end of execution of execution unit 16 is obtained.

To execute the different instructions, execution unit 16 thus receives the instruction Inst and the argument Arg of the function to be executed.

When the instruction Inst to be executed corresponds to a computer function of application of a logic level Set_GPO_Init, execution unit 16 directly controls controlled switches by means of signal Cmd1 according to the argument Arg transmitted by loading unit 15. Similarly, to execute a toggle instruction, execution unit 16 controls inverters 21 by means of signal Cmd2 according to the transmitted argument Arg.

These application and toggle functions may be implemented synchronously with the decoding of the instructions implemented by loading unit 15. For the other wait and synchronization functions, it is necessary to inhibit the operation of loading unit 15 for a duration. For this purpose, the clock signal Clk1 transmitted to the loading unit is preferably generated by the inhibition unit 17 controlled by the control signal Cmd3 of execution unit 16. Thus, for a synchronization instruction, execution unit 16 waits for the detection of the programmed synchronization signal before lifting the inhibition of inhibition unit 17 and enable loading unit 15 to carry on the loading of a new instruction Inst and of its argument Arg. Similarly, inhibition unit 17 is also used during a wait instruction. In this case, execution unit 16 uses counter 18 to count for a wait duration corresponding to the programmed argument Arg before lifting the inhibition of inhibition unit 17.

Instead of using an inhibition unit 17 directly positioned on the clock signal of loading unit 15, an end-of-execution signal FinExec may be transmitted to loading unit 15 by execution unit 16, when the execution is over and execution unit 16 can receive a new instruction Inst.

Further, the wait instruction may be coded in the form of two distinct instructions: a long wait and a short wait with arguments of different length. In both cases, execution unit 16 is capable of interpreting these two waits by means of counter 18.

As concerns the program restarting instruction, this instruction only aims at modifying the position of pointer Point of loading unit 15. For this purpose, execution unit 16 uses control signal Cmd4 to displace pointer Point onto the position corresponding to the programmed argument Arg.

In addition to these six instructions, it is possible to implement a seventh instruction with a 3-bit coding for these different instructions. Preferably, the seventh instruction corresponds to the placing of elementary machine 14 in a low power consumption mode. In this mode, the execution unit may control the deactivation of a portion of the electronic components of elementary machine 14 to limit its power consumption.

Figure 4:
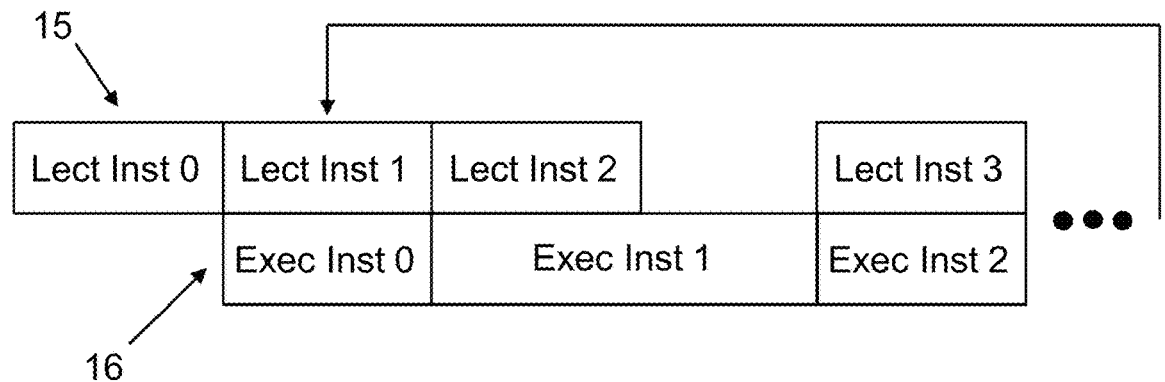
FIG. 4 illustrates the sequencing of the operations between the loading unit and an execution unit of the elementary machine of FIG. 2.

As illustrated in FIG. 4, the relations between loading unit 15 and execution unit 16 are sometimes regular and sometimes irregular. For application or toggle instructions, at the first clock signal, loading unit 15 reads instruction Inst, and then transmits the argument Arg of this instruction Inst to execution unit 16. At the second clock cycle, loading unit 15 loads the second instruction Inst while execution unit 16 executes the first instruction Inst.

The second instruction requires an inhibition of loading unit 15, for example, for the synchronization of a signal on a control input GPI_0, GPI_1 of elementary machine 14. Thus, during the third clock cycle, loading unit 15 reads the third instruction hist, while execution unit 16 executes the second instruction while inhibiting the operation of loading unit 15. When the second instruction is executed, for example, when the signal of a detector 19 is received by execution unit 16, the operation of loading module 15 is reactivated, and the latter may load a new instruction Inst while execution unit 16 executes the previously-loaded instruction Inst.

This operation between loading unit 15 and execution unit 16 enables to rapidly and efficiently generate the different phases of a detector 10. Thus, it is possible to form a generator 10 of phases of a detector with a single elementary machine 14.

Figure 5:
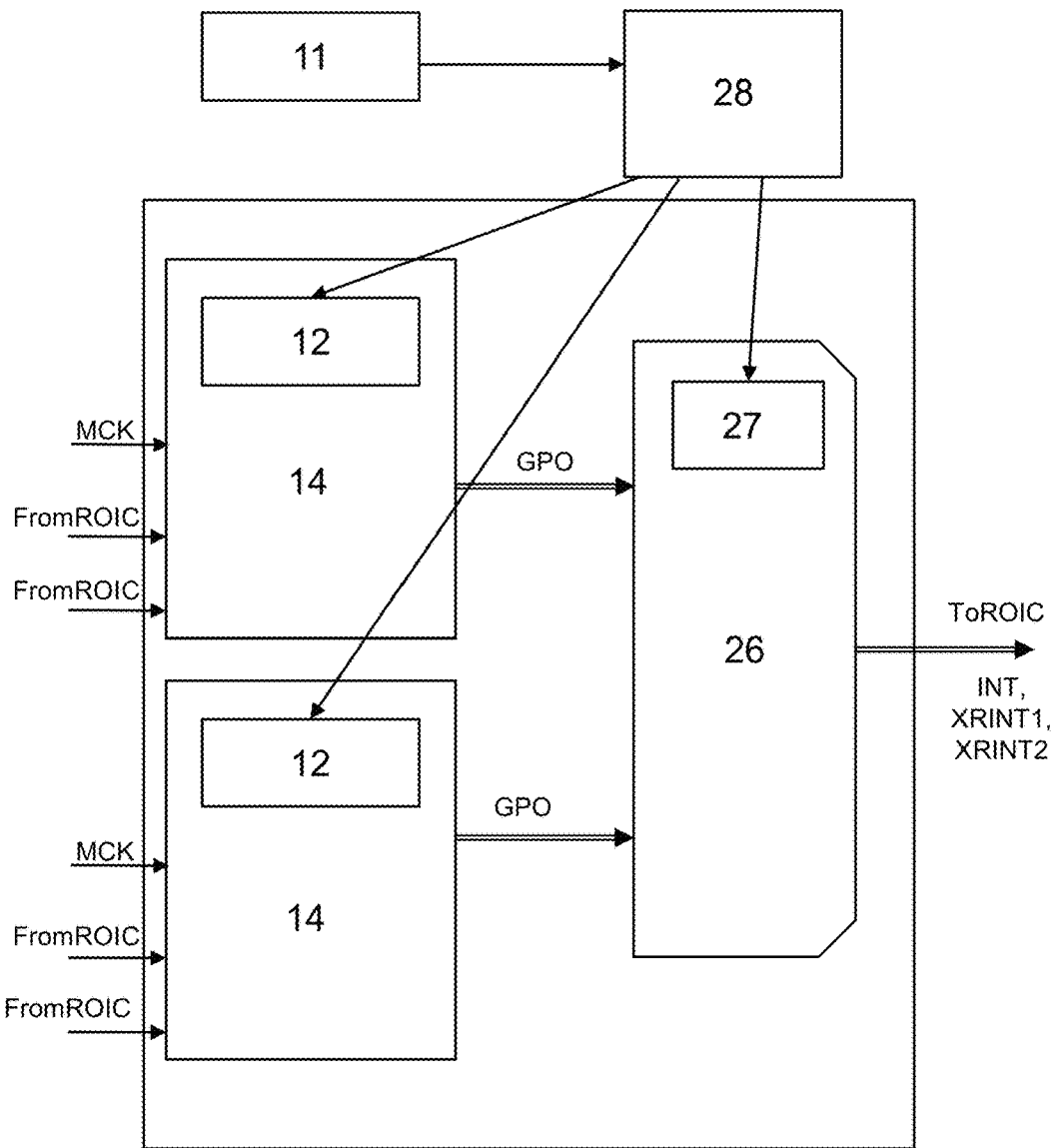
FIG. 5 illustrates a generator of programmable phases integrating two elementary machines of FIG. 2.

To improve the number of phases that may be generated, phase generator 10 may comprise a plurality of juxtaposed elementary machines 14, as illustrated in FIG. 5.

In the example of FIG. 5, two elementary machines 14 are used and each elementary machine 14 integrates its own register 12. Further, the outputs of elementary machines 14 are introduced into a programmable multiplexer 26 having a register 27 enabling to specify the routing topology.

Based on programming file 11, programming machine 28 can thus program the two registers 12 of the two elementary machines 14 as well as the register 27 of programmable multiplexer 26.

In the example of FIG. 5, the control inputs GPI_0, GPI_1 of the two elementary machines 14 are associated with signals originating from a detector FromROIC, while the outputs of programmable multiplexer 26 form the phases INT, XRINT1, XRINT2 enabling to control the operation of detector ToROIC. As a variant, it is possible to use one or a plurality of control inputs GPI_0, GPI_1 of an elementary machine 16 to control the phase generation mode by using a synchronization computer function on a control input GPI_0, GPI_1.

Figure 6:
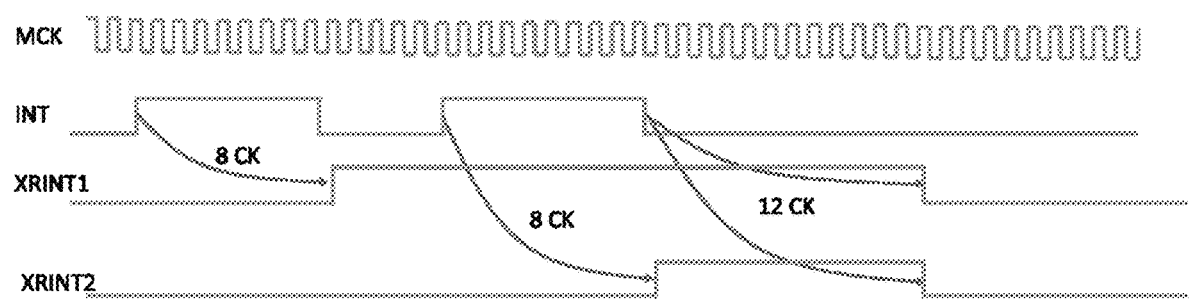
FIG. 6 illustrates an example of phases generated by the programmable phase generator of FIG. 5.

FIG. 6 illustrates an example of characteristic phases of a detector 10 generated from the programming file 11 of FIG. 1 and implemented by an elementary machine 14. As illustrated in FIG. 6, a clock signal MCK is used to rate the generation of the different phases INT, XRINT1, XRINT2 and the transitions between these phases INT, XRINT1, XRINT2 appear with the wait durations, 8 and 12, coded in programming file 11.

The invention thus enables to generate the phases INT, XRINT1, XRINT2 of a detector, for example, of an infrared detector. By reprogramming phase generator 10, the shape of the phases may be determined after the forming of the detector by taking into account the technical limitations thereof. Thus, the shape of the phases can be optimal according to the desired operating mode.

Further, the simplicity of the components used to implement this phase generator 10 enables to limit its power consumption, so that the power consumption of programmable phase generator 10 is similar to that of a hardcoded phase generator integrating more than 15 operating modes.

The invention claimed is:

1. A generator of phases of a detector, the generator integrating at least one elementary machine for interpreting a microcode stored in a register, each elementary machine comprising:

at least one control input comprising a logic level change detector;

at least one phase output comprising a controlled switch, enabling to define the logic level of the phase output, and a controlled inverter enabling to toggle the logic level of the phase output;

at least one clock signal associated with a counter;

a unit for loading the instructions and the arguments stored in the register, the instructions being coded over 3 bits and enabling to implement at least:

an application of a logic level onto at least one phase output;

a toggling of the logic level of at least one phase output;

a synchronization with a logic change of a control input;

a wait for a predetermined duration; and a restarting of a predetermined sequence;

means for inhibiting the loading unit; and a unit for executing the instructions loaded by the loading unit, the execution unit being configured to:

control the position of at least one controlled switch after an instruction of application;

control the activation of at least one controlled inverter after an instruction to toggle;

detect a logic change after an instruction of synchronization;

control the inhibition of the inhibition means for a duration measured by the counter after a wait instruction; and control the position of a pointer of the loading unit after a restart instruction.

2. The phase generator according to claim 1, wherein said means for inhibiting the loading unit are interposed between a clock signal of the elementary machine and a clock signal transmitted to the loading unit.

3. The phase generator according to claim 1, wherein the instructions enable to implement:

a short wait; and a long wait;

the length of the argument of the long wait being greater than the length of the argument of the short wait.

4. The phase generator according to claim 3, wherein the argument of the short wait is coded over 4 bits.

5. The phase generator according to claim 3, wherein the argument of the long wait is coded over 14 bits.

6. The phase generator according to claim 1, wherein an instruction enables to place the elementary machine in a low power consumption mode, where the execution unit inhibits the operation of a plurality of components of the elementary machine.

7. The phase generator according to claim 1, wherein the execution module executes an instruction while the loading unit loads the next instruction to be executed by the execution unit.

8. The phase generator according to claim 1, wherein the phase generator comprises at least two elementary machines.

9. The phase generator according to claim 1, wherein the phase generator comprises a programmable multiplexer arranged at the output of said at least one elementary machine.

* * * * *